(No Model.)
J. J. RYAN.
VEHICLE POLE.
No. 358,168. Patented Feb. 22, 1887.
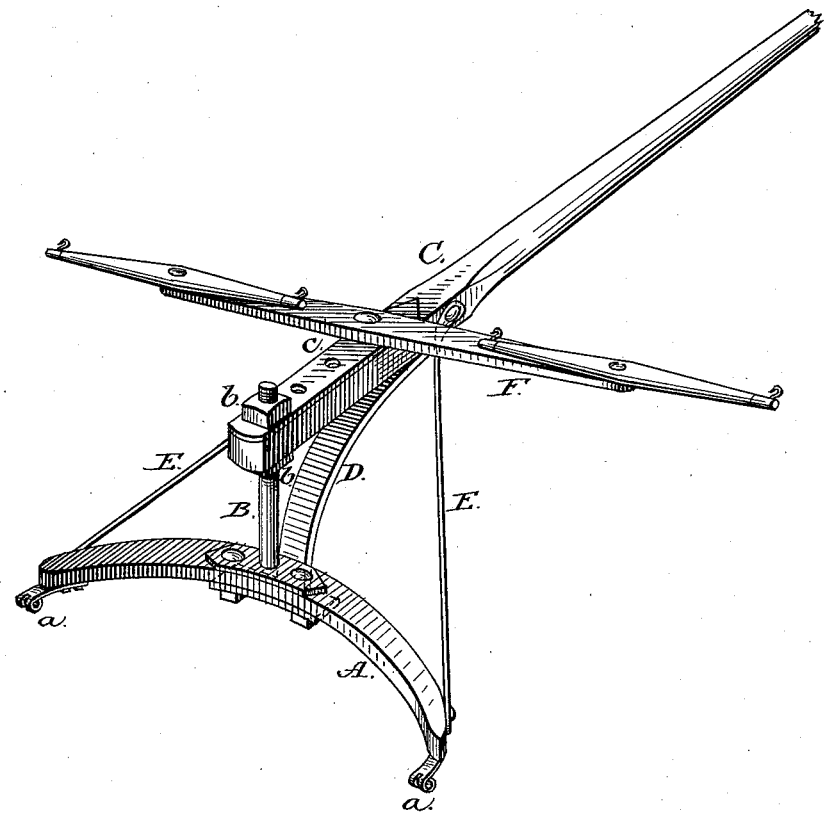
WITNESSES:
John A. Ellis
C. Sedgwick
INVENTOR:
J. J. Ryan
BY Munn & Co
ATTORNEYS.

UNITED STATES PATENT OFFICE.

JOHN J. RYAN, OF SARDIS, MISSISSIPPI.

VEHICLE-POLE.

SPECIFICATION forming part of Letters Patent No. 358,168, dated February 22, 1887.

Application filed July 29, 1886. Serial No. 209,446. (No model.)

*To all whom it may concern:*

Be it known that I, JOHN J. RYAN, of Sardis, in the county of Panola and State of Mississippi, have invented a new and Improved Vehicle-Pole, of which the following is a specification, reference being had to the annexed drawing, which is a perspective view.

The object of my invention is to provide a vehicle-pole which will permit of the use of a straight piece of timber in its construction in lieu of the ordinary curved pole, and which will permit of hitching the horses nearer the vehicle.

My invention consists in the construction and arrangement of parts, as will be hereinafter fully described and claimed.

The curved bar A is provided at its ends with pole-couplings a for attachment to the running-gear of a vehicle. To the top of the curved bar A, at the center thereof, is secured an upright standard, B, which extends through the rear end of the pole C, and is provided with nuts b, by means of which the pole is clamped tightly in place on the standard B.

To the under surface of the curved bar A is secured a curved brace, D, which extends forward and is secured to the under surface of the pole. Braces E, secured to the sides of the pole, extend obliquely downward, and are secured to the curved bar A near its ends. The upper surface of the pole is provided with the usual wearing-plate, c.

The height of the pole is determined by the length of the standard B and braces D E.

By my improved construction the whiffletrees F may be placed at the extreme rear end of the pole, if desirable, thus permitting of hitching the horses near the vehicle, where they may pull to greater advantage.

Having thus described my invention, what I claim as new, and desire to secure by Letters Patent, is—

1. The combination, with the curved bar A, having couplings at its ends, of the vertical standard projecting up from the center of the curved bar and the straight pole C, secured at its rear end to the upper end of the standard, substantially as set forth.

2. The combination, with the bar A, adapted to be attached to the vehicle, of the standard B, secured to the top of the pole, the curved brace D, secured to the bar A and under side of the pole C, and braces E, attached to the sides of the pole and to the ends of the bar A, substantially as shown and described.

3. The combination of the straight pole C, the curved bar A, the curved brace D, the standard B, extending through the pole and provided with nuts b b, the wearing-plate c, the braces E, attached to the pole C and bar A, and the pole-couplings a, substantially as shown and described.

JOHN J. RYAN.

Witnesses:
JOHN WRIGHT,
G. C. HARMON.